United States Patent Office 3,509,240
Patented Apr. 28, 1970

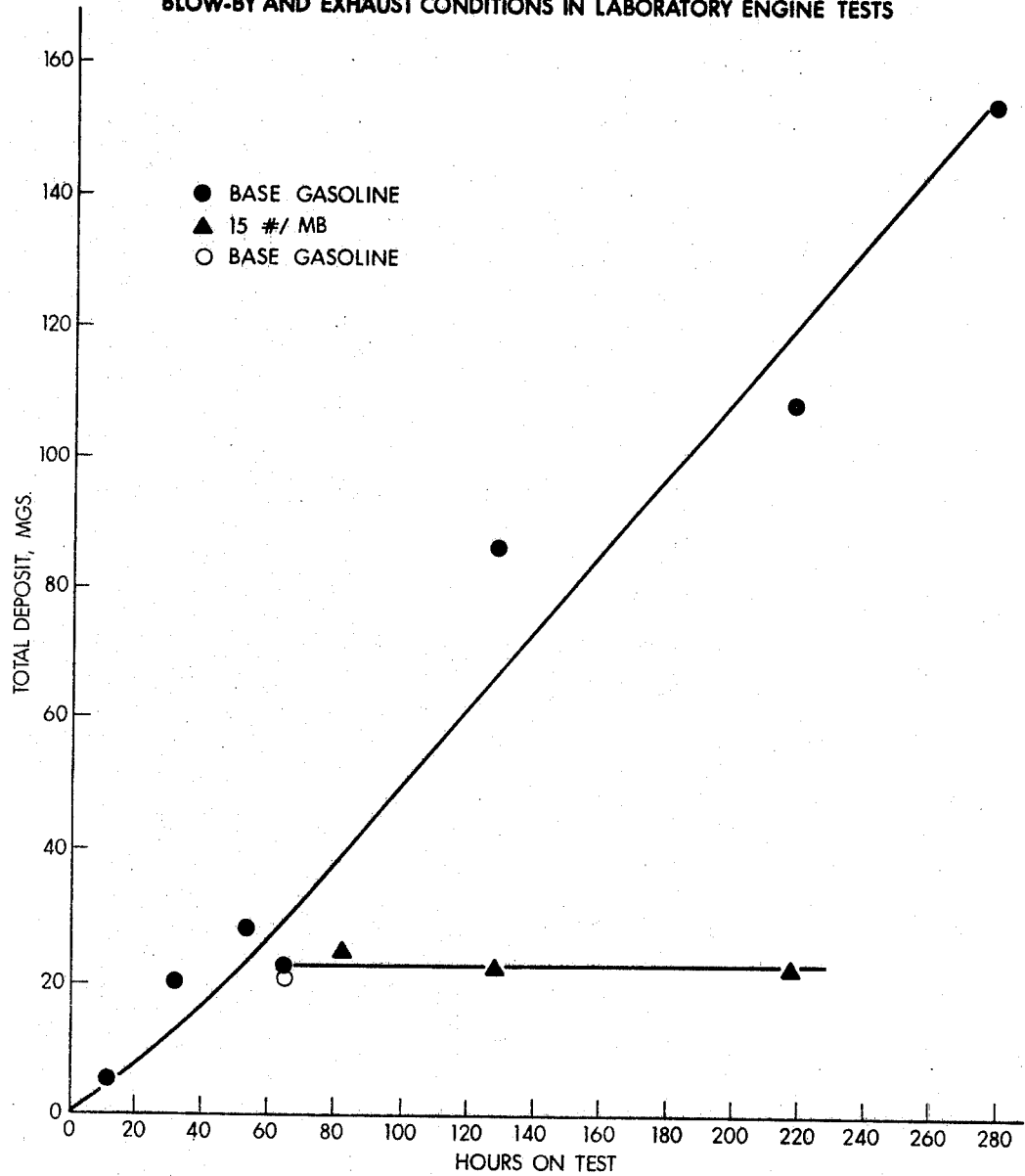

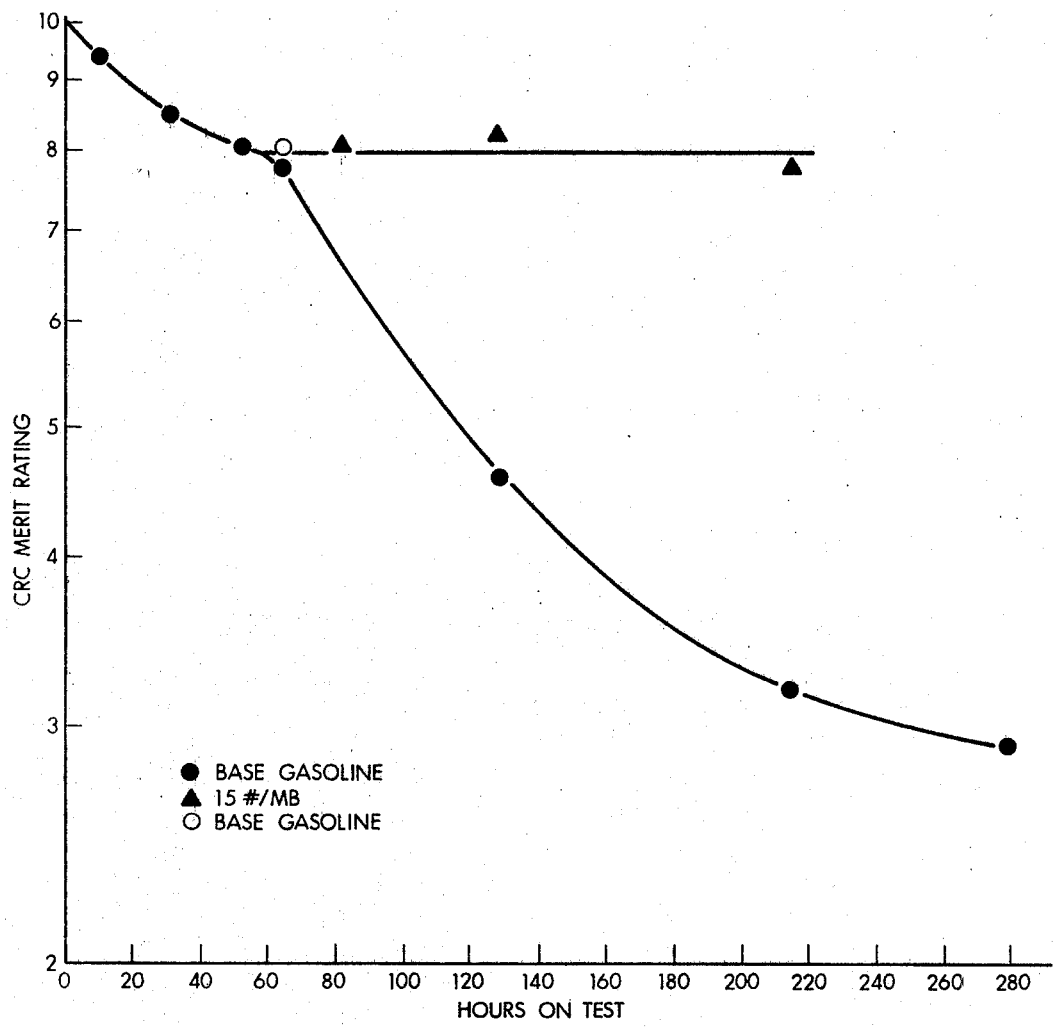

3,509,240
PRIMARY AMINE SALTS OF MONO- AND DI-
ALKYL PHOSPHORIC ACID ESTERS THAT
HAVE BEEN HEAT TREATED
Alexander H. Popkin, Maplewood, N.J., assignor to Esso
Research and Engineering Company, a corporation of
Delaware
Original application July 12, 1962, Ser. No. 209,414.
Divided and this application Feb. 20, 1967, Ser.
No. 645,073
Int. Cl. C07f 9/08; C10l 1/26; C09k 3/00
U.S. Cl. 260—924
13 Claims

ABSTRACT OF THE DISCLOSURE

Mono and di $C_{12}$–$C_{20}$ alkyl phosphoric acid esters are fully neutralized with primary $C_1$–$C_6$ alkyl amines followed by treating the resultant acid addition salts at a temperature between about 220° and about 350° F. for from about 1 to about 18 hours to produce novel amine-phosphate esters which are useful multi-purpose additives in liquid hydrocarbon motor fuels boiling in the range of from 80° to 420° F.

---

This application is a division of copending application Ser. No. 209,414, filed July 12, 1962, now abandoned, and a continuation of that same parent application, Ser. No. 617,723, filed July 12, 1962, is now U.S. Patent No. 3,884,466, issued May 21, 1968.

The present invention is concerned with a class of novel compositions useful as multi-purpose additives in liquid hydrocarbons. In particular, the present invention is concerned with a class of reaction products of mono and dialkyl acid esters of phosphoric acid reacted with a particular primary amine. More particularly, the class of compounds of the present invention functions in gasoline and motor fuels as anti-stalling agents, as anti-rust agents and also act to substantially reduce combustion chamber deposits. The present class of compounds are excellent as carburetor detergents, anti-rust additives, anti-icing additives and combustion chamber deposit modifiers. A very desirable multi-functional compound of the present invention comprises normal butyl amine reacted with a reaction product of $C_{13}$ oxo alcohols and phosphoric pentoxide.

The utility of the instant invention as a surfactant anti-icing additive in petroleum products, and more particularly in gasoline is intended primarily to overcome certain operational difficulties in connection with automotive, marine, stationary, and aircraft engines. The difficulties referred to result in frequent stalling of the engine under idling conditions when the engine is used in an atmosphere with relatively high humidity and a temperature below about 60° F. It has been determined that the cause of repeated engine stalling in cool, humid weather is the formation of ice from moisture in the air in the carburetor of the engine. On a cool, moist day gasoline evaporating in the carburetor exerts sufficient refrigerating effect to condense and freeze moisture present in the air entering the carburetor. This phenomenon is now well-known in the art and is especially severe in connection with gasolines having a 50% ASTM distillation point of less than about 220° F.

It is known by those skilled in the art to use various anti-icing additives in gasolines in order to minimize the tendency of an engine to stall under cool, moist atmospheric conditions. These anti-icing additives have for the most part been composed of low molecular weight aliphatic mono- and dihydric alcohols. It has been found that these additives of the freezing point depressant type have an inherent disadvantage in that they tend to absorb water and thereby promote excessive rusting and other attendant problems.

Another problem which has long existed in the handling and use of petroleum products is the rusting which frequently occurs in pipe lines, storage tanks, engines, etc. Rusting of equipment in which petroleum products are stored and used occurs as the result of traces of moisture inevitably present in petroleum distillates. Moisture finds its way into the distillates in a variety of ways. While water is not appreciably soluble in petroleum distillates, traces of moisture are, in fact, dissolved in heating oil, gasoline, kerosene, etc., principally from absorption of atmospheric moisture. There have been a number of suggestions for overcoming the corrosion due to moisture carried by oil products. For example, a number of water-soluble rust inhibitors are known and have been employed. Use of water-soluble inhibitors is disadvantageous for several reasons, however. The inhibitor is largely lost when the water is separated from oil products during handling so that the desired rust inhibition for remaining residual traces of water may be lost.

Various types of phosphorus compounds have been added to gasoline in the prior art for various purposes including rust-prevention and ice-prevention; but no additive composition of that prior art has embodied the multi-functional character of the compositions of the present invention and few additives of that prior art have performed equally well any of the functions of the compositions of the present invention. These compositions therefore constitute a remarkably novel and useful improvement over the prior art limited functional additives.

As pointed out heretofore, the present class of compounds function excellently as carburetor detergents. It is known in the art that harmful deposits accumulate in the carburetors of motor vehicles from the tremendous quantities of contaminated air utilized for the engine operation. It is believed that the major contributor to this type of contamination in the air is the combustion products exhausted from other cars operating in the area. The condition is aggravated by fumes from the operation of the car's engine and by underhood fumes generated by the car's engine over and above the industrial fumes which the carburetor breathes. These deposits cause rough idling of the engine and may cause frequent stalling. Although the motor is not responsible for these effects, it offers the best agency for introducing a material which serves as a cure for such undesirable conditions by preventing the deposit build-up in the carburetor. This carburetor difficulty is also aggravated by automobiles which contain highly developed intricate carburetors which operate satisfactorily only as long as ports, valves, passages, and the like are free from such carburetor deposits. It is known that many carburetors, particularly the multi-barrel carburetors, develop carburetor trouble after 2000 to 5000 miles. As mentioned heretofore, this carburetor difficulty is observed initially by the rough idling of the engine. Thus, it is necessary to adjust the carburetor so that the engine will not stall when the foot throttle is released. The mechanism is that at engine idle, the speed of intake air approaches sonic velocity around the edge of the throttle plate and a mechanical separation takes place which removes entrained matter from the intake air and deposits it in the annular opening at the under edge of the throttle plate. It is estimated that deposition amounts to as much as 2% of the total foreign matter in the intake air. Thus, deposition is considerably higher when gum forming material, such as crankcase blow-by is present. Also, some carburetors have an offset in the idle air passage where deposits form. Mechanical separation takes place as a result of the impact of intake air contaminants on the floor of the offset. A small deposit peak is formed which can close off the idle air passage. Generally, such deposits form more slowly than those in the throttle body. Thus, as pointed out heretofore, the present class of compounds function as excellent carburetor detergents and prevent this undesirable build-up of deposits in the carburetor.

Attempts in the past to provide suitable oil soluble rust inhibitors have been not completely successful and are complicated by a number of factors. It is necessary that such inhibitors should not degrade the oil product or affect critical inspections of the oil. In particular, its use in gasoline should not excessively degrade the octane number of the gasoline.

It is therefore an object of this invention to provide as new composition of matter a novel class of reaction products as more fully described below having particular utility as a multi-purpose hydrocarbon additive, particularly as carburetor detergents and anti-rust inhibitors. A more specific object of this invention is to provide a petroleum fuel additive useful as a combination anti-icing agent, rust-inhibitor, engine deposit modifier, and carburetor detergent. Further objects and the nature of the invention will be more apparent from the discussion which follows.

Thus, the present invention is concerned with a very effective class of multi-functional gasoline additives which give protection against stalling due to ice formation in carburetors, which are effective anti-rust agents, which give carburetor detergency and which modify the harmful effects of combustion chamber deposits. These compounds are prepared utilizing higher molecular weight alcohols as, for example, those containing 11 to 20 carbon atoms in the molecule. A preferred class of alcohols are those containing from about 13 to about 16 carbon atoms in the molecule. A very desirable source of these alcohols are from the oxo process. The additives of the present invention are obtained by the neutralization of these alcohols with a mixture of mono and diesters of phosphoric acid which esters are formed with low molecular weight amines, preferably primary amines ranging from methyl to hexyl. One preferred material is the n-butylamine salt of $C_{13}$ oxo mixed esters of phosphoric acid. Another preferred material is the n-butylamine salt of $C_{16}$ oxo mixed ester of phosphoric acid.

These compounds may be used in a concentration which varies from about 2 lbs. to 160 lbs./1000 barrels of gasoline and are preferably used in a concentration of 5 lbs. to 50 lbs./1000 barrels. These gasolines may contain other additives such as tetraetyl lead, anti-oxidants, solvent oil and other materials. These oxo alcohols as, for example, the $C_{13}$ oxo alcohols are prepared by the oxonation and subsequent hydrogenation of a $C_{12}$ olefin. In essence, the oxo process consists of reacting an olefin with carbon monoxide and hydrogen to produce an aldehyde containing one more carbon atom than the olefin feed. The aldehyde is then hydrogenated ot the corresponding primary alcohol. A suitable catalyst is cobalt on kieselguhr or other suitable support. The temperature is generally in the range from about 120 to 150° C. and the pressure in the range from about 100 to 250 atmospheres.

A typical analysis of a $C_{13}$ and a $C_{16}$ oxo alcohol product is as follows:

OXO ALCOHOL PRODUCT

|  | Weight Percent | |
|---|---|---|
|  | $C_{13}$ | $C_{16}$ |
| $C_{11}$ | 3 |  |
| $C_{12}$ | 31 |  |
| $C_{13}$ | 64 |  |
| $C_{14}$ | 2 | 3 |
| $C_{15}$ |  | 15 |
| $C_{16}$ |  | 75 |
| $C_{17}$ |  | 7 |
|  | 100 | 100 |

The desirability of the compounds of the present invention and their method of manufacture may be readily appreciated by the following examples illustrating the same.

Example 1

The effectiveness of the class of additives of the present invention is sensitive to the method of manufacture. A typical method of manufacture is shown by the following conditions.

INGREDIENTS AND REACTION CONDITIONS FOR THE PREPARATION OF 2400 LBS. OF PRESENT ADDITIVE (1000 GALLON REACTOR)

(I) Reaction of $C_{13}$ oxo alcohol with $P_2O_5$ (A) INGREDIENTS

| | Lbs. |
|---|---|
| $C_{13}$ oxo alcohol | 1176 |
| $P_2O_5$ | 278 |

(B) REACTION CONDITIONS

Charge reactor with $C_{13}$ oxo alcohol. Apply nitrogen blanket and add $P_2O_5$ as quickly as possible, maintaining the reaction temperature at 165° F. maximum. $P_2O_5$ addition requires no more than ½–1 hour. Maintain heat at 165° F. for a total of 19 hours. The final product is a light straw colored liquid, slightly cloudy. Yield 99+%. Approximately 50% of the mono and 50% of the diester was secured.

Typical analyses: Percent P=8.42. Theory: Percent P=8.41.

(II) Reaction of $C_{13}$ oxo mixed ester of phosphoric acid with n-butylamine (primary amine)

(A) INGREDIENTS $C_{13}$ oxo mixed ester of phosphoric acid, total from I above (approx. 1450 lbs.)

| | Lbs. |
|---|---|
| n-Butylamine | 299 |
| Kerosene | 645 |

(B) REACTION CONDITIONS

Kerosene was added to $C_{13}$ oxo mixed ester of phosphoric acid from I above. Stir for 5 minutes, apply nitrogen blanket and add n-butylamine during about one hour. The reaction temperature rose to about 170° F. due to exothermic reaction. Heat was then applied and the reaction mixture brought to a temperature of 250° F. and maintained at 250° F. for 4 hours. The resulting n-butylamine salt of $C_{13}$ oxo mixed ester of phosphoric acid is a clear bright yellow liquid, 73% active ingredient. Yield 98–99%.

Typical analyses: Percent P=4.81, percent N=2.40. Theory: percent P=5.09, percent N=2.39.

The temperature may vary in the range from about 220° F. to 350° F., but is preferably in the range from about 245° F. to 255° F. as, for example, 250° F. The product must be maintained at this temperature for a period in excess of one hour, preferably for a time period in the range from 3 to 18 hours, as for example about 4 hours.

Example 2

Another method for the preparation of the present additive is as follows:

(I) Reaction of $C_{13}$ oxo alcohol with $P_2O_5$ (A) INGREDIENTS

| | Grams |
|---|---|
| $C_{13}$ oxo alcohol | 3842 |
| $P_2O_5$ | 907 |

(B) REACTION CONDITIONS

| Total Reaction Time | Reaction Temp., °F. | Comment |
|---|---|---|
| | 68 | Alcohol charged to reaction zone; $P_2O_5$ addition started. |
| 4 min | 115 | 442 grams $P_2O_5$ added; ice-water coolant applied. |
| 25 min | 127 | All $P_2O_5$ in. |
| 38 min | 120 | Heat applied. |
| 50 min | 147 | |
| 1 hr., 33 min | 170 | Starting 19 hours heat treatment at 165° F. |
| 2 hrs., 40 min | 165 | |
| 20 hrs., 33 min | 165 | End of heat treatment at 165° F. Product light straw-colored, slightly cloudy liquid. |

Wt. of $C_{13}$ oxo mixed ester of phosphoric acid (grams) _____ 4742
Theory (grams) _____ 4749
Yield (percent) _____ 99+

(II) Reaction of $C_{13}$ oxo mixed ester of phosphoric acid with n-butylamine (Nitrogen blanket used throughout reaction)

(A) INGREDIENTS

| | Grams |
|---|---|
| $C_{13}$ oxo mixed ester of phosphoric acid | 1620 |
| n-Butylamine | 349 |
| Kerosene | 755 |

(B) REACTION CONDITIONS

| Total Reaction Time | Reaction Temp., °F. | Comment |
|---|---|---|
| | 70 | $C_{13}$ oxo mixed ester of phosphoric acid and kerosene charged to flask; n-butylamine addition started; heat liberated due to exothermic reaction. |
| 7 min | 97 | 10% n-butylamine added. |
| 12 min | 111 | |
| 17 min | 122 | |
| 22 min | 138 | 50% n-butylamine added. |
| 42 min | 169 | All n-butylamine added; heat applied. |
| 1 hr., 12 min | 250 | Start of four hours heat treatment at 250° F. |
| 5 hrs., 12 min | 250 | End of heat treatment at 250° F., product clear, bright, yellow-colored liquid. |

Wt. of present additive, n-butylamine salt of
$C_{13}$ oxo mixed ester of phosphoric acid (grams) _ 2675
Theory (grams) _____ 2724
Yield (percent) _____ 98

Example 3

The potent anti-rust properties of the present additive, prepared as described in Example 1, are illustrated in the following table wherein the additive was mixed in concentrations as illustrated in a typical gasoline.

ANTI-RUST PROPERTIES AT LOW CONCENTRATIONS IN GALVANIC COUPLE RUST TEST

[500 ml. additive blend together with 0.5% methanol and 0.5% synthetic sea water are stirred for one-half hour in contact with a steel-zinc couple. The test mixture is then allowed to stand without stirring and in contact with the steel-zinc couple for the balance of the test (five to seven days). The amount of rust on the steel panel (4″ x 1″) is recorded periodically during test.]

| Additive | Conc. #/1,000 Bbls. | Percent Rust at Indicated Storage Time | | |
|---|---|---|---|---|
| | | 24 hrs. | 48 hrs. | 144 hrs. |
| Present additive | 2½ | 0 | 0 | <1 |
| | 5 | 0 | 0 | <1 |
| | 12½ | 0 | 0 | <1 |
| Com. additive A (dimer of linoleic+small amt. of phosphorus compound) | 2½ | 1 | 1 | <2 |
| | 5 | <1 | <1 | <2 |
| Com. additive B (phosphate ester chain $C_{10}$-$C_{10.5}$ reacted with diamine) | 12½ | <1 | <1 | 2 |
| | 2½ | <1 | <1 | 1 |
| | 5 | <1 | <1 | 2 |
| | 12½ | 0 | 0 | 1 |
| Com. additive C (mixture of mono and dioleoamide obtained by reacting oleic acid with long chain diamine) | 2½ | 15 | 15 | 20 |
| | 5 | 5 | 5 | 5 |
| | 12½ | 7 | 7 | 12 |
| None | | 40 | 40 | [1] 40 |

[1] At 72 hours.

From the above, it is apparent that the additive of the present invention is far superior in anti-rust properties as compared to other commercial additives.

Example 4

The additive of the present invention prepared as described in Example 1 was further tested by static rust tests with the following results.

| Additive | Conc. #/1,000 Bbls. | Percent Rust at Indicated Storage Time | | |
|---|---|---|---|---|
| | | 24 hrs. | 48 hrs. | 144 hrs. |
| Present Additive | 2½ | 0 | 0 | 1 |
| | 5 | 0 | 0 | 0 |
| | 12½ | 0 | 0 | <1 |
| Commercial Additive A | 2½ | <1 | <2 | 4 |
| | 5 | <1 | 1 | <2 |
| | 12½ | <1 | <1 | 1 |
| Commercial Additive B | 2½ | 4 | 5 | 5 |
| | 5 | 2 | 3 | 3 |
| | 12½ | <1 | <1 | <1 |
| Commercial Additive C | 2½ | <1 | 2 | 30 |
| | 5 | <2 | <3 | 35 |
| | 12½ | 0 | 0 | 0 |
| None | | 0 | <2 | 40 |

*Static rust test.*—200 ml. additive blend together with 2.5% isopropanol and 2.5% synthetic sea water are stored at room temperature, with a steel panel immersed in the gasoline phase, for three weeks or longer. The amount of rust on the steel panel (1″ x 1″) is recorded periodically.

From the above, it is apparent that the additive of the present invention is far superior with respect to anti-rust properties as compared to other commercial additives.

Example 5

On low volatility fuels (47% off at 212° F.) the additive as prepared by Example 1 has a high anti-icing potency as shown by the following data.

| Conc., #/1,000 Barrels | Stall Reduction, Percent |
|---|---|
| 20 | 70 |

Example 6

The anti-icing potency of the additive prepared as described in Example 1 is illustrated in the following table.

| Conc., #/1,000 Barrels | Stall Reduction, percent |
|---|---|
| 20 | 20 |
| 40 | 40 |

*Anti-icing test technique.*—Icing tests are carried out in a cold room equipped with air conditioning equipment capable of delivering aerosol free air with 70–95% relative humidity controlled within ±1.5% at any given setting in this range. The car used for anti-icing tests is operated on a dynamometer in cycles consisting of 30 seconds at 1500 r.p.m. under road load conditions and then 15 seconds at idle. The number of cycles in which stalling occurs over the number of total cycles is a measure of the anti-stalling effectiveness of the fuel or additive blend.

Example 7

The additive as prepared by Example 1 will impair the octane number to only a minimum degree as shown by the following data.

| Blend of 40#/1,000 Barrels Present Additive in Indicated Gasoline | Average Octane Number Effect in Twenty Direct Match Determinations | |
|---|---|---|
| | Δ Research Octane Number | Δ Motor Octane Number |
| High Test | −0.085 | 0.00 |
| Regular | −0.090 | 0.00 |

Example 8

The additive prepared as described in Example 1 will not adversely affect the stability characteristics of a gasoline to which it is added as illustrated in the following table.

| Additive Conc., #/1,000 bbl. | ASTM Breakdown* Time, min. | Copper** Beaker Gum, mg./100 ml. | ASTM Δ Solvent Washed, Gum ΔΔ, mg./100 ml. | G.M. Gum ΔΔ, mg./100 ml. |
|---|---|---|---|---|
|  | 15 | 15 | 15 | 15 |
| Additive: |  |  |  |  |
| Present | 960+ | 3.2 | 1.2 | 2.4 |
| None (Base Gasoline) | 960+ | 3.2 | 0.4 | 2.2 |

*ASTM Test D-525-55.
** Use copper beaker of same shape and size as glass beaker ASTM-D-381. Heat 100 cc. sample at 400° F. for 90 minutes, cool and weigh.
Δ Similar to (**) except wash with heptane and weigh.
ΔΔ Employ beaker ASTM-D-381. Hold in bath at temperatures 345° to 360° F. Blow air over 100 cc. sample for 90 minutes and weigh.

Example 9

The additive prepared by Example 1 will not adversely affect intake manifold deposits as shown as follows:

BAFFLED MANIFOLD TESTS ON 40#/1,000 BBLS. BLENDS OF ADDITIVE IN GASOLINE

| Additive | Gasoline | Mg. Deposit/Lb. Fuel, Acetone Soluble |
|---|---|---|
| Present | High Test | 0.4 |
| None | do | 2.2 |
| Present | Regular¹ | 3.7 |
| None | do | 2.0 |

¹ Does not contain solvent oil.

Example 10

The additive prepared by Example 1 has acceptable water tolerance properties. When mixed with gasoline in the presence of caustic bottoms, the haze cleared up comparable when using other additives as shown by the following data.

40#/1000 BBL. ADDITIVE BLEND IN GASOLINE SHAKEN FOR TWO MINUTES WITH 1.0 VOL. % CAUSTIC BOTTOMS

Additive:   Time for disappearance of haze, min.
- Present additive _____ 60
- Commercial additive A _____ 60
- Commercial additive B _____ 60
- None _____ 5

Example 11

The additive prepared as described in Example 1 using four hours of heating will not cause filter plugging as shown by the data in the following table.

50 G. ADDITIVE IN 2,000 CC. GASOLINE EXTRACTED WITH 200 CC. CAUSTIC BOTTOMS

| Additive Processing | | Pressure in 24 Hours Laboratory Filter Plugging Test¹ | |
|---|---|---|---|
| Filtered C₁₃ Oxo Mixed Ester of Phosphoric Acid | Hours Heating at 250° F. at End of Reaction | Observed Pressure, ΔP | Corrected Pressure² ΔΔP |
| Yes | 4 | 0.5 | 0 |
| Yes | 8 | 0.5 | 0 |
| No | 4 | 0.7 | 0 |
| No | 8 | 0.9 | 0.2 |
|  | ½ | ³ 5.4 |  |
|  | ½ | ⁴ 5.5 |  |
| None (Base Gasoline) |  | ⁵ 0.7 |  |

¹ Filter completely plugged at 5.5 ΔP.
² Observed pressure minus 0.7 ΔP obtained with base gasoline.
³ 57% filtered.
⁴ 58% filtered.
⁵ Avg. of three tests—0.5, 0.7, 1.0 ΔP.

24-HOUR LABORATORY FILTER PLUGGING TEST—PRECIPITATE DEVELOPING TEST 5 gallons of gasoline blend are stirred with 0.5 vol. percent caustic bottoms extract for one-half hour at 165 r.p.m. in stainless steel tank fitted with zinc-1010 steel shell couple. The blend is then allowed to age without stirring for an additional 23½ hrs. The blend is then pumped at 175 ml./min. through 12.6 cm. 10μ AC Filter while stirring at 100 r.p.m. Complete plugging occurs when a pressure drop of 5.4 in. Hg is developed.

Example 12

The additive prepared by Example 1 will not cause filter plugging due to suspended solids. These results are based on the 48 hour filter plugging test.

| Additive | Conc., #/1,000 Bbls. | ΔP in 48-Hours Laboratory Storage Stability Test, Solids Suspendability Phase¹ |
|---|---|---|
| Present | 40 | 0.9 |
| Commercial | 20 | ² 5.5 |
| Additive C |  |  |

¹ Complete filter plugging at 5.5 ΔP.
² 70% of the fuel through when filter was completely plugged.

48-HOUR LABORATORY FILTER PLUGGING TEST—SOLIDS SUSPENDABILITY TEST

Five gallons of gasoline plus 0.5 vol. percent pH 9 buffered water are placed in stainless steel container with a zinc-1010 steel shell couple. Mixture is stirred for ½ hour at 165 r.p.m. and then allowed to age without stirring for an additional 23½ hours. The gasoline is then pumped at 175 ml./min. through 12.6 cm. 10μ AC Filter while stirring at constant 100 r.p.m. The sediment formed during the 24-hour period is retained in the stainless steel container.

The zinc-steel couple is removed from the stainless steel container, the five gallons of filtered gasoline added to the container and the test additive added. The same stirring, aging, and pumping conditions are repeated as in the first 24 hrs. In this case, complete plugging occurs when a pressure drop of 5.4 in. Hg is obtained.

Example 13

The additive prepared by Example 1 shows very good carburetor detergency action as shown by the following data.

64 HOURS LABORATORY CHEVROLET ENGINE TEST USING 15 #/1,000 BBL. ADDITIVE BLENDS IN HIGH TEST FUEL

|  | Wt. of Deposits on Throat and Throttle Plate, Mg. | Cooperative Research Committee Merit Rating on Throat and Throttle Plate |
|---|---|---|
| Test 1 | 5.5 | 9.3 |
| Test 2 | 3.5 | 9.6 |
| (None Base Gasoline) | 23.7 | 8.7 |
|  | 20.9 | 8.1 |
|  | 24.1 | 7.3 |
|  | 23.2 | 7.8 |

From the above, it is apparent that the additive of the present invention is a potent carburetor detergent.

Example 14

The additive prepared by Example 1 was tested by the Southwest Research Institute test in a 1954 Plymouth.

ONE HOUR DIRTY-UP ON BASE GASOLINE FOLLOWED BY FIVE HOURS CLEAN-UP WITH ADDITIVE BLEND, 12½ #/1,000 BBL. CONC.

|  | Δ Percent Deposits,¹ Black Area in Throat Sleeve |
|---|---|
| Present Additive | 14.4 |

¹ Δ% = percent deposits after one hour dirty-up—percent deposits after five hours clean-up; results are averages of three tests per additive.

(A) Test equipment (1) 1954 six cylinder Plymouth engine.
(2) Carburetor equipped with clear plastic throttle body.

(3) Device for full crankcase blow-by return to carburetor inlet.

(B) Test procedure (1) Cycle: Eight minutes at 400 r.p.m. by six rapid accelerations from 400 r.p.m. to 1500 r.pm. (during approx. one sec) and return to 400 r.p.m. by means of "electronic throttle accelerator."

(2) Full crankcase blow-by return to carburetor inlet.

(3) One hour dirty-up on L–4 base gasoline followed by five hour clean-up with additive blend and no crankcase blow-by to carburetor.

(C) Rating

Visual rating of throat area reported as percent and color density level.

From the foregoing, it is apparent that the additive of the present invention is an excellent carburetor detergent.

Example 15

The additive prepared by Example 1 has no tendency toward zinc precipitation in galvanic tests shown by the following data.

PLANT PRODUCTION ADDITIVE SHOWS NO TENDENCY TOWARD ZINC PRECIPITATE FORMATION IN GALVANIC TESTS

| Water Bottoms Used in Galvanic Zinc Corrosion Tests | #/1,000 Bbl. Conc. of Additive in Gasoline | Zinc Precipitate Formation in Galvanic Test |
|---|---|---|
| 0.5% Methanol, 0.5% Synthetic Sea Water | 80 | None. |
| 0.5% Caustic Bottoms Extract [1] | 40 | Do. |

[1] Blend of 50 g. additive in 2,000 cc. of gasoline, extracted with 200 cc. caustic bottoms.

*Galvanic zinc corrosion test.*—500 ml. additive blend together with desired water bottoms are stirred for one-half hour in contact with a zinc-steel couple. The test mixture is then allowed to stand without stirring for an additional 23½ hours. The zinc-steel couple is then removed, the test mixture allowed to stand for an additional 72 hours. The blend will give zinc precipitate filter plugging in the field if a fluocculent precipitate, visible to the naked eye, is present at the end of the test.

The invention may be more fully understood by reference to the attached figures further illustrating the same.

FIGURE 1 shows the build-up of carburetor deposits when using the additive of the present invention as compared to not using the same. In FIGURE 1, in 280 hours when not using the additive the total deposits approximate 160 milligrams whereas when the additive is used, a maximum deposit of 20 milligrams is secured. This is extremely significant since the operation was carried out under the severe operating conditions as listed in Example 13.

FIGURE 2 shows that when using the additive of the present invention, the merit rating will level off about 8 whereas in a gasoline where the additive is not utilized, the merit rating drops off rapidly.

Thus, the additive of the present invention has potent anti-rust properties and also is a very effective carburetor detergent. The additive improves the anti-icing characteristic of the fuel as well as functioning as a combustion chamber deposit modifier. The additive has excellent hydrocarbon solubility, will not effect or attack brass and will not cause filter plugging due to zinc precipitate formation due to zinc precipitates. The additive does not have an adverse effect on fuel octane quality or in gasoline stability. The additive has acceptable water tolerance properties and will function very excellently as a multipurpose gasoline additive.

The additive of the present invention may be employed in conjunction with a variety of other additives commonly used in fuels. Typical of such additives are rust inhibitors, corrosion inhibitors, anti-oxidants, dispersants, dyes, dye stabilizers, wax inhibitors, anti-static agents, and the like.

Anti-icing agents for example are isopropyl alcohol, hexylene glycol, carbitol and other known anti-icing agents. Of particular interest is the combination of the additive of this invention with isopropyl alcohol as a combination anti-icing anti-rust additive package.

What is claimed is:

1. A composition of matter which comprises a primary $C_1$–$C_6$ alkyl amine addition salt of mixed mono and di $C_{12}$–$C_{20}$ alkyl phosphate esters, said amine salt having been heated to a temperature of between about 220° and about 350° F. for from about 1 hour and about 18 hours.

2. A composition as defined by claim 1 wherein said esters are mono and di oxo alkyl phosphate esters.

3. A composition as defined by claim 2 wherein each alkyl group of said esters contains from about 13 to about 16 carbon atoms in the molecule.

4. A composition as defined by claim 3 wherein each alkyl group of said esters contains 13 carbon atoms and wherein said amine is primary normal butyl amine.

5. A composition as defined in claim 1 wherein the temperature is maintained between about 245° and about 255° F. for a time period of between about 2 and about 4 hours.

6. A composition as defined in claim 1 wherein the temperature is about 250° F. and the time is about 4 hours.

7. A composition as in claim 6 wherein the phosphate esters are a mixture of mono $C_{13}$ oxo alkyl and di $C_{13}$ oxo alkyl phosphates.

8. A composition as in claim 6 wherein the phosphate esters are a mixture of mono $C_{16}$ oxo alkyl and di $C_{16}$ oxo alkyl phosphates.

9. A process for the preparation of a composition of matter which comprises reacting mixed mono and di $C_{12}$–$C_{20}$ alkyl phosphate esters with a primary $C_1$–$C_6$ alkyl amine and maintaining a temperature in the range of from about 250° to about 350° F. for a period of time between about 1 and about 18 hours after all of the amine has been reacted with the phosphate esters.

10. A process as defined by claim 9 wherein the temperature is maintained in the range of from about 240° to about 255° F. for a period of time from about 2 and about 4 hours.

11. A process as in claim 9 wherein the temperature is maintained at about 250° F. for about 4 hours.

12. A process as in claim 9 wherein the esters are mono and di $C_{13}$–$C_{16}$ oxo alkyl phosphate esters.

13. A process as in claim 12 wherein the amine is primary normal butyl amine.

References Cited

UNITED STATES PATENTS

| 2,508,431 | 5/1950 | Smith et al. | 260—924 XR |
| 2,656,372 | 10/1953 | Ernst et al. | 260—925 |
| 2,863,904 | 12/1958 | Cantrell et al. | 260—925 |

CHARLES B. PARKER, Primary Examiner

A. H. SUTTO, Assistant Examiner

U.S. Cl. X.R.

44—76; 252—389; 260—925, 987, 989